United States Patent
Chang et al.

[11] Patent Number: 5,805,693
[45] Date of Patent: Sep. 8, 1998

[54] MONITOR-CONTROLLING DEVICE

[75] Inventors: Chern-Jsair Chang; Rong-Tyan Wu, both of Hsinchu, Taiwan

[73] Assignee: Holtek Microelectronics, Inc, Hsinchu, Taiwan

[21] Appl. No.: 677,107

[22] Filed: Jul. 9, 1996

[51] Int. Cl.[6] .................................................. H04M 1/00
[52] U.S. Cl. .................... 379/352; 379/88; 379/93.17; 379/354; 379/280; 340/825.44
[58] Field of Search ................... 379/352, 93.17, 379/157, 201, 354, 88, 93.23; 348/19; 364/927.92, 942.3, 239; 345/87; 340/825.44, 825.15

[56] References Cited

U.S. PATENT DOCUMENTS

| | | | |
|---|---|---|---|
| 4,585,904 | 4/1986 | Mincone et al. | 379/88 |
| 4,625,276 | 11/1986 | Benton | 379/91.01 |
| 5,541,640 | 7/1996 | Larson | 379/93.17 |

FOREIGN PATENT DOCUMENTS 84545  11/1991  Taiwan .

*Primary Examiner*—Fan Tsang
*Assistant Examiner*—Jacques M. Saint-Surin
*Attorney, Agent, or Firm*—Knobbe, Martens, Olson & Bear, LLP.

[57] ABSTRACT

A monitor-controlling device is disclosed. The monitor-controlling device, used for a system having a monitor and a first circuit, includes a buffer for storing data from the system; a decoder electrically connected to the buffer for receiving and decoding the data; a bi-directional transmitter electrically connected to the buffer for providing the buffer with a path to transmit the data to the first circuit; and a controlling circuit electrically connected to the bi-directional transmitter for controlling the path on or off.

20 Claims, 2 Drawing Sheets

MONITOR-CONTROLLING DEVICE

FIELD OF THE INVENTION

The invention relates to a monitor-controlling device, and more particularly to a monitor-controlling device with a bi-directional interface. It will be recognized that the present invention has a wider range of applicability. Merely by way of example, the invention may be applied in other communication systems.

BACKGROUND OF THE INVENTION

Industry utilizes or has proposed various monitor-controlling devices in different communication applications. The monitor of the communication device, such as telephone, is generally controlled by the micro processor. Between the monitor and the micro processor, there are tens of pins for the use of communication and control. The wide bus between the monitor and the micro processor is therefore a must. This will result in the complexity and the unstability of the internal circuits.

One device to solve the above-identified problems is disclosed in Taiwan Pat. No. 84545 issued to Chang. FIG. 1 shows the block diagram of this conventional device. The device includes a dialer 1, a LCD (liquid crystal display) monitor driver 2 and a LCD monitor 3. The interface between the LCD monitor driver 2 and the dialer 1 is uni-directional. That is, after the dialer outputs the data (such as the time data, the date data and the timer data) to the LCD monitor driver 2, the LCD monitor driver 2 will not transmit the above-mentioned data to the other external circuits. The flexibility of the LCD monitor driver 2 is therefore limited.

From the above it is seen that a more stabilized and flexible and less complicated monitor-controlling device is often desired.

SUMMARY OF THE INVENTION

One objective of the present invention is to provide a bi-directional monitor controlling device with a bi-directional interface.

A further objective of the present invention is to provide a monitor controlling device with less complexity.

A yet another objective of the present invention is to provide a monitor-controlling device with more flexibility.

Still an objective of the present invention is to provide a monitor-controlling device with more stability.

In a specific embodiment, the present monitor-controlling device with a bi-directional interface is used for a system (for example a communication system) having a monitor and a first circuit (for example, a dialer of the communication device or a micro processor of the communication device). The monitor-controlling device includes a buffer for storing data (for example, the telephone number or the user's name) from the system; a decoder electrically connected to the buffer for receiving and decoding the data; a bi-directional transmitter electrically connected to the buffer for providing the buffer with a path to transmit the data to the first circuit; and a controlling circuit electrically connected to the bi-directional transmitter for controlling the path on or off.

Certainly, the data can be transmitted from the buffer to the first circuit and still stored in the buffer when the path is on.

Certainly, the situation can be the data cannot be transmitted from the buffer to the first circuit when the path is off.

Certainly, the buffer can be a shift register, which uses the clock signal of the system as the operating clock signal.

Certainly, the present monitor-controlling device can further include a timer signal generator electrically connected to the buffer for providing the buffer with time data; and a clock signal generator electrically connected to the buffer for providing the buffer with clock data.

Certainly, the controlling circuit can control the timer signal generator to transmit the timer data to the buffer and the clock signal generator to transmit the clock data to the buffer.

Certainly, the controlling circuit can control which kind of data is transmitted to the decoder.

Certainly, the monitor can be a LCD monitor

Certainly, the monitor can be a LED monitor.

Certainly, the monitor-controlling device can be used in a Caller ID system.

Certainly, the data can be shown on the monitor after the data are decoded by the monitor.

The forgoing and other objects, features, and advantages of the present invention will be apparent from the following more particular description of a preferred embodiment of the invention, as illustrated in the accompanying drawings.

DETAILED DESCRIPTION OF THE PREFERRED EMBODIMENT

Figure 1:
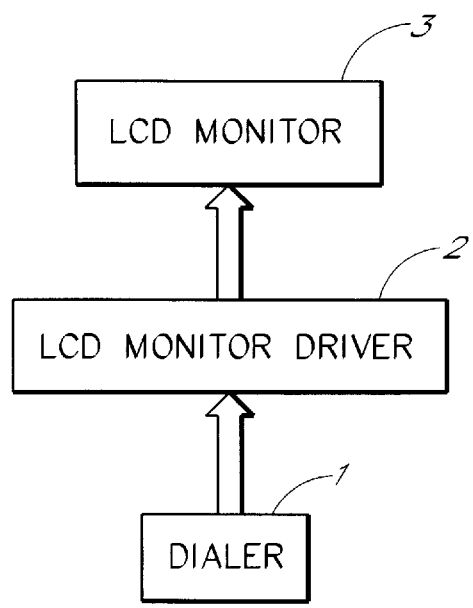
FIG. 1 schematically shows the block diagram of a monitor device disclosed in Taiwan Pat. No. 84545 issued to Chang.
Figure 2:
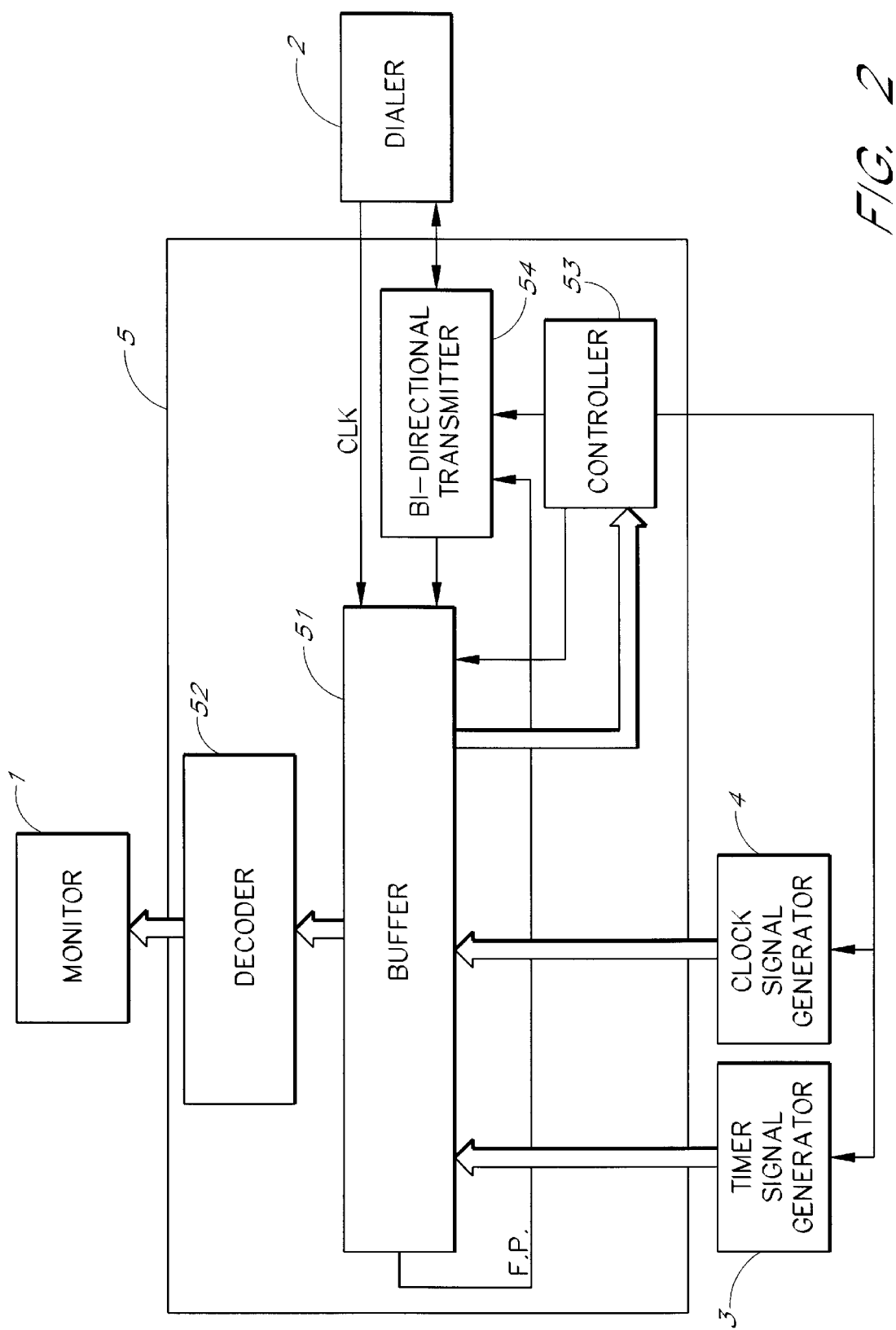
FIG. 2 schematically shows one preferred embodiment of the present invention.

FIG. 2 is a schematic block diagram of one preferred embodiment according to the present invention. The present monitor-controlling device 5 with a bi-directional interface includes a buffer 51, a decoder 52, a controlling circuit 53 and a bi-directional transmitter 54. The monitor-controlling device 5 further includes a timer signal generator 3 and a clock signal generator 4.

The decoder 52 is electrically connected to the monitor 1. Taking the telephone device for example, the buffer 51 is electrically connected to the dialer 2 of the telephone device, the timer signal generator 3 and the clock signal generator 4. The data code and the control code from the dialer 2 are transmitted into the buffer 51 by way of the bi-directional transmitter 54. According to said control code, the controlling circuit 53 decides whether the bi-directional transmitter 54 provides the buffer 51 with a feedback path f.p. to transmit the data back to the dialer 54.

The operation of the present invention can be outlined as follows: (1) uni-directional transmission operation and (2) bi-directional transmission operation.

On the condition of the uni-directional transmission (i.e., the bi-directional transmitter 54 cuts off the feedback path f.p.), the controlling circuit 53 allows the buffer 51 to transmit the data to the decoder 52. The data in the buffer 51 includes the name data and the number data from the dialer 2, the timer data from the timer signal generator 3, and the clock data from the clock signal generator 4. The controlling circuit 53 can decide which kind of data to be sent to the decoder 52. After being decoded by the decoder 52, the data can be shown on the monitor 1.

On the condition of the bi-directional transmission, the controlling circuit 53 is in the bi-directional transmission operation in response to the control code and therefore allows the bi-directional transmitter 54 to turn on the feedback path f.p. The data in the buffer 51 can be transmitted back to the dialer 2 and thus be used by other external circuits. The buffer 51 can be implemented by a shift register. The clock signal for the shift register 51 is from the circuit outside the monitor-controlling device 5, e.g., the clock CLK from the dialer 2. After every clock, a one-bit data code is transmitted to the shift register 51. When the feedback path f.p. is on, owing to the fact that the number of the clock signal CLK is equal to the stages of the flip-flops of the shift register 51, the data originally in the shift register 51 are transmitted to the external circuits and still stored in the shift register 51. According to the characteristics of the shift register used in this embodiment of the present invention, the above-mentioned operation can be easily understood by one skill in the art.

To sum up, the present invention, a monitor-controlling device, with a bi-directional interface, used for a system having a monitor, has the following advantages:

(1) By using a shift register as a data-storing buffer of the monitor-controlling device, the data in the shift register can also be used by other external circuits. The present monitor-controlling device can be more flexible in various applications.

(2) According to the present invention, the clock signal for the shift register is provided by the circuit outside the monitor-controlling device 5, so we don't need any synchronous circuit. The manufacturing cost is therefore decreased.

(3) In addition, the shift register only needs two wires to transmit the data to the external circuits, so the wide bus is spared and the resulting circuits are more stable and less complicated.

Certainly, in the selection of the monitor used for the communication system, the LCD monitor or the LED monitor is suitable. In the application, the present invention can be used in the dialer or micro processor of a communication system. Morever, it can be solely used in the application which requires diaplaying the time, the name, etc. For example, the present invention is suitable for the Caller ID system of the telephone and telegraph office.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures. For example, while the description above is in terms of telephone systems, it would be possible to implement the present invention with other communication systems.

Therefore, the above description and illustration should not be taken as limiting the scope of the present invention which is defined by the appended claims.

What is claimed is:

1. A monitor-controlling device, adapted to be used for a system having a monitor and a first circuit, comprising:
    a buffer for storing data from said system;
    a decoder electrically connected to said buffer for receiving and decoding said data;
    a bi-directional transmitter electrically connected to said buffer for providing said buffer with a path to transmit said data to said first circuit; and
    a controlling circuit electrically connected to said bi-directional transmitter for controlling said path on or off.

2. A monitor-controlling device as set in claim 1 wherein said data are transmitted from said buffer to said first circuit when said path is on.

3. A monitor-controlling device as set in claim 2 wherein said data are still stored in said buffer after said data are transmitted from said buffer to said first circuit.

4. A monitor-controlling device as set in claim 1 wherein said data are not transmitted from said buffer to said first circuit when said path is off.

5. A monitor-controlling device as set in claim 1 wherein said buffer is a shift register.

6. A monitor-controlling device as set in claim 5 wherein said shift register uses the clock signal of said system as the operating clock signal.

7. A monitor-controlling device as set in claim 1, further comprising:
    a timer signal generator electrically connected to said buffer for providing said buffer with time data; and
    a clock signal generator electrically connected to said buffer for providing said buffer with clock data.

8. A monitor-controlling device as set in claim 7 wherein said controlling circuit controls said timer signal generator to transmit said timer data to said buffer, and said clock signal generator to transmit said clock data to said buffer.

9. A monitor-controlling device as set in claim 7 wherein said controlling device controls which kind of data is transmitted to said decoder.

10. A monitor-controlling device as set in claim 1 wherein said system is a communication system.

11. A monitor-controlling device as set in claim 10 wherein said first circuit is a dialer of said communication device.

12. A monitor-controlling device as set in claim 10 wherein said first circuit is a micro processor of said communication device.

13. A monitor-controlling device as set in claim 1 wherein said communication system is a telephone system.

14. A monitor-controlling device as set in claim 1 wherein said monitor is a LCD monitor.

15. A monitor-controlling device as set in claim 1 wherein said monitor is a LED monitor.

16. A monitor-controlling device as set in claim 1 wherein said monitor-controlling device is used in a Caller ID system.

17. A monitor-controlling device as set in claim 1 wherein said monitor-controlling device has a bi-directional interface.

18. A monitor-controlling device as set in claim 1 wherein said data are shown on said monitor after said data are decoded by said monitor.

19. A monitor-controlling device as set in claim 1 wherein said data includes a telephone number.

20. A monitor-controlling device as set in claim 1 wherein said data includes a user's name.

* * * * *